June 28, 1966 E. M. BRADLEY 3,258,752

MANUFACTURE OF STORAGE DEVICES

Filed June 6, 1960

INVENTOR
EDWARD MICHAEL BRADLEY
BY Hane and Nydick
ATTORNEYS

United States Patent Office 3,258,752
Patented June 28, 1966

3,258,752

MANUFACTURE OF STORAGE DEVICES

Edward Michael Bradley, Stevenage, England, assignor to International Computers and Tabulators Limited, London, England Filed June 6, 1960, Ser. No. 34,242
Claims priority, application Great Britain, June 8, 1959, 19,492/59
11 Claims. (Cl. 340—174)

This invention relates to data storage apparatus employing magnetic films.

United States patent application Serial No. 779,310, filed December 10, 1958 and now abandoned, describes data storage elements using anistropic magnetic films. Such a film has an "easy" direction of magnetisation with which the magnetisation of the sample is aligned in the absence of an applied magnetic field. The film has a "hard" direction of magnetisation which is perpendicular to the easy direction.

The storage element may be said to be in the binary zero state when the magnetisation vector is aligned with easy direction in one sense. The application of a suitable magnetic field to the element will cause the magnetisation vector to turn through 180° to be aligned in the opposite sense and the element is then set in the binary one state. The patent application describes two methods of switching the storage element from one state to the other. Firstly, switching may be effected by a field applied in the easy direction. This field may be produced by current in one, or more drive conductors. Secondly switching may be effected by the simultaneous application of a field in the hard direction and a field in the easy direction. Both these methods are satisfactory for simple elements, but are less satisfactory when one or more elements out of many has to be selectively switched, as in a storage matrix. Tolerances on the switching fields, and hence tolerances on the drive currents which produce them, tend to be reduced because it is difficult in practice to produce a large number of storage elements which have substantially identical magnetic characteristics.

It is an object of the invention to provide an improved data storage element employing a magnetic film.

It is another object of the invention to provide an improved data storage matrix utilising a plurality of individual magnetic film elements.

According to this invention a magnetic data storage device includes a storage element comprising an area of thin film of anisotropic magnetic material having an easy axis of magnetisation and a hard axis of magnetisation perpendicular thereto, both axes lying in the plane of the film, said storage element being switchable predominantly by domain rotation between two stable magnetic states in which the magnetisation vector is in alignment with the easy axis, in one state in one direction and in the other state in the opposite direction, first means for applying a first magnetic field in the plane of the film at an acute angle to the easy axis to cause rotation of the magnetisation vector through said acute angle, second means for applying a second magnetic field in the plane of the film and perpendicular to said first field to cause in conjunction with said first field further rotation of the magnetisation vector past the direction of the hard axis to switch the element from one state to the other state and sensing means responsive to rotation of the magnetisation vector to produce an electrical signal.

According to another aspect of the invention a data storage device includes a storage element on a substrate and comprising an area of thin film of anisotropic magnetic material having an easy axis of magnetisation and a hard axis of magnetisation perpendicular thereto, both axes lying in the plane of the film, said storage element being switchable predominantly by domain rotation between two stable magnetic states in which the magnetisation vector is in alignment with the easy axis, in one state in one direction and in the other state in the other direction, a first conductor coupled with the film and extending in a direction at an acute angle to the hard axis and a first current generator for passing an electric current through said first conductor to produce a first magnetic field in the film at said acute angle to the easy axis to cause rotation of the magnetisation vector through said acute angle, a second conductor coupled with the film and extending perpendicular to said first conductor and a second current generator for passing an electric current through said second conductor to produce a second magnetic field in the film perpendicular to the first field to cause in conjunction with said first field further rotation of the magnetisation vector past the direction of the hard axis to switch the element from one state to the other state, and a third conductor coupled with said film and arranged so that rotation of the magnetisation vector produces a voltage in the third conductor, said conductors being insulated from one another.

The invention also includes a magnetic data storage matrix in which a plurality of storage elements are arranged in rows and columns and each comprises an area of thin film of anisotropic magnetic material having an easy axis of magnetisation and a hard axis of magnetisation perpendicular thereto, both axes lying in the plane of the element, said storage elements being switchable predominantly by domain rotation between two stable magnetic states in which the magnetisation vector is in alignment with the easy axis in one state in one direction and in the other state in the opposite direction, a first set of spaced parallel conductors extending along the rows of elements and a second set of spaced parallel conductors extending along the columns of elements each perpendicular to and insulated from said first set, each conductor of one set crossing all the conductors of the other set, the storage elements being located, adjacent to the crossings of the conductors with the easy axes thereof forming an acute angle with the conductors of the second set, row selection means for passing an electric current through a selected conductor of the first set to cause the magnetisation vectors of the elements in the corresponding row to rotate through said acute angle and column selection means for passing an electric current through a selected conductor of the second set to cause in conjunction with the current in the conductor of the first set further rotation of the magnetisation vector of that element located both in the selected row and selected column past the hard axis direction to switch the element from one state to the other state, and a third set of spaced parallel conductors each extending along a conductor of the second set and arranged so that rotation of the magnetisation vector of an element in a column produces an electric signal in the corresponding conductor of the third set.

The invention will now be described, by way of example, with reference to the accompanying drawing, in which.

Figure 1:
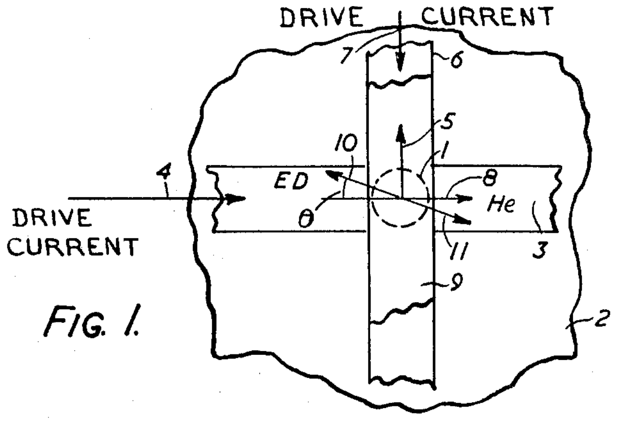
FIGURE 1 shows a single magnetic film storage element.

The physical construction of a storage element is generally similar to that described in the above-mentioned patent application. A circular spot of anisotropic magnetic film 1 is deposited on a substrate 2. Over the spot 1 is a strip conductor 3.

Two other strip conductors 6 and 9 lie over the spot 1 and are at right angles to the conductor 3. The conductors 3 and 6 are used to carry drive currents, and the conductor 9 is used for pick-up purposes, having signals induced therein when the magnetic state of the film is changed. The conductors 3, 6 and 9 may be copper strips, or they may be deposited or plated, for example. The conductors are insulated from each other and from the film by suitable insulating layers (not shown), as described in the above-mentioned patent application. The substrate 2 may be glass, or it may be a non-magnetic conductor as described in United States patent application Serial No. 16,695, filed March 22, 1960, now abandoned. The sequence in which the conductors are laid over the film 1 may be different. For example, the pick-up conductor 9 may be next to the film to provide maximum coupling. The return path for the conductor 9 may be provided by a further similar conductor, or by the substrate itself if it is conductive.

In a modified construction of storage device the film deposited on a substrate is continuous, for example as indicated by the area referenced 2 in FIG. 1, and the storage element consists of a discrete area of film as indicated by reference 1, the area 1 being that part of the film which is effective to be switched by the applied magnetic fields.

The conductor 3 may carry a drive current in the direction indicated by arrow 4. This current produces a substantially uniform field $H_d$ in the film in the direction indicated by arrow 5. The conductor 6 may carry a drive current in the direction indicated by arrow 7. This latter current produces a substantially uniform field $H_e$ in the film in the direction indicated by arrow 8.

The easy direction of magnetisation of the film is indicated by arrows 10 and 11. It will be seen that the film is so oriented relative to the conductors that there is an angle $\theta$ between the easy direction of magnetisation and the direction of the field $H_e$. The angle $\theta$ may be 5° in a practical case.

Let it be assumed that the magnetisation vector of the film lies in the direction of arrow 10. This corresponds to the binary zero state of the film. A drive current pulse of sufficient amplitude to produce a field $H_d$ greater than that required to saturate the film in the hard direction is now passed through the conductor 3, in the direction of arrow 4.

Domain rotation occurs in the film and the magnetisation vector is aligned with the direction of the applied field, that is, in the direction of the arrow 5. This movement of the vector induces a voltage pulse, of positive polarity, for example, in the pick-up conductor 9. The magnetisation vector has to rotate through less than 90° from the original position in order to align with the field $H_d$, so that the vector will return to the original position when the drive pulse ceases. This return movement is in the opposite direction, but of equal extent to the initial rotation. Hence a negative pulse will be induced in the pick-up conductor 9. Thus, the application of a drive pulse to the conductor 3 when the film is in the zero state produces no permanent change in the state of the film, but produces pulses of equal amplitude and opposite polarity in the pick-up conductor coincident with the leading and trailing edge respectively of each drive pulse. The equality of amplitude assumes that the rise and fall times of the drive pulse are substantially the same.

It has already been noted that the anisotropic nature of the film causes the magnetisation vector to return to the easy direction on the removal of the applied field. Theoretical analysis of the properties of the film predicts that the "restoring torque" on the vector due to the anisotropy is not constant and that it is a maximum at 45° to the easy direction. It also predicts that, if a further field is applied in the direction of arrow 8 during the decay of the field in the arrow direction 5, the vector will rotate through the 90° position and align in the direction of arrow 11 when this further field is removed. The minimum magnitude necessary for the field in the direction of arrow 8 to produce switching of the film is independent of the magnitude of the field $H_d$, provided that the field $H_d$ is sufficient to move the vector more than 45° from the easy direction. The minimum value of the field $H_e$ is that which is just sufficient to move the vector through the 90° position.

As will be explained, the state of the film may be read out by applying a drive pulse to the conductor 3. The amplitude of this pulse is larger than the minimum required for reading in. It is convenient to use a pulse of the same amplitude for both read in and read out, so that the practical minimum amplitude is determined by the minimum required for reading out.

Since it is necessary that the field $H_e$ should be applied during decay of the field $H_d$ and since the pulses are relatively short, it is convenient to make the drive pulse on the conductor 6 start before, and finish after, the drive pulse on the conductor 3. Thus, concurrent application of these drive pulses to the two conductors causes the film to be switched from the binary zero state to the binary one state.

The field $H_d$ cannot cause switching of the film from the zero to the one state, in the absence of the field $H_e$, so that the value of the field, and hence the value of the drive current in the conductor 3, is not critical provided it exceeds the minimum value. The field $H_e$ must exceed a minimum value to ensure that switching from zero to one state occurs and it must not be so large that it can cause switching in the absence of the field $H_d$. For one particular sample of film the minimum value of $H_d$ was 4 oersted and operation with $H_d$ equal to 10 oersted was also satisfactory; the minimum value of $H_e$ was .5 oersted and the maximum of $H_e$ was 1.2 oersted. The sample was approximately 1 cm. in diameter, 1600 A. in thickness and was prepared by deposition on to a glass substrate at 300° C. from a 81/19 nickel-iron alloy, using an aligning field of 80 oersted during deposition. The angle $\theta$ was 6°.

It will be seen that the tolerances on the drive current pulses are very much greater than are possible with conventional half current selection techniques. The minimum and maximum values of the fields are a function of the magnetic characteristics of the film, so that even the figures quoted may be improved upon by careful control of the manufacture of the film.

If a current pulse is applied to the conductor 3 when the film is in the one state, the magnetisation vector will rotate from the direction of arrow 11 to that of arrow 5. This rotation will generate a negative pulse in the pick-up conductor 9. The vector will rotate further to the direction of the arrow 10 when the current pulse ceases. Thus, the current pulse has switched the film from the one state to the zero state and has caused two negative pulses to be generated in the pick-up conductor 9.

It will be apparent that the film element may be switched from the zero state to the one state by the concurrent application of drive pulses on the conductors 3 and 6, in order to store a binary one. The application of a drive pulse on the conductor 3 only resets the film to the zero state if it was previously in the one state and generates two pulses of the same polarity in the pick-up conductor. If the film is already in the zero state, the single drive pulse leaves the state unaltered and generates two pulses of unlike polarity in the pick-up conductor. Hence the state of the film prior to the application of the single drive pulse may be determined by testing the polarity of the pulse produced in the pick-up conductor on the occurrence of the leading edge of the drive pulse.

The switching time of the film has not been accurately measured, but tests with driving pulses with a rise time of 100 millimicroseconds suggests that the switching time is probably of the order of a few millimicroseconds. The switching time is in any case very much smaller than can be obtained with conventional ferrite core storage devices.

Figure 2:
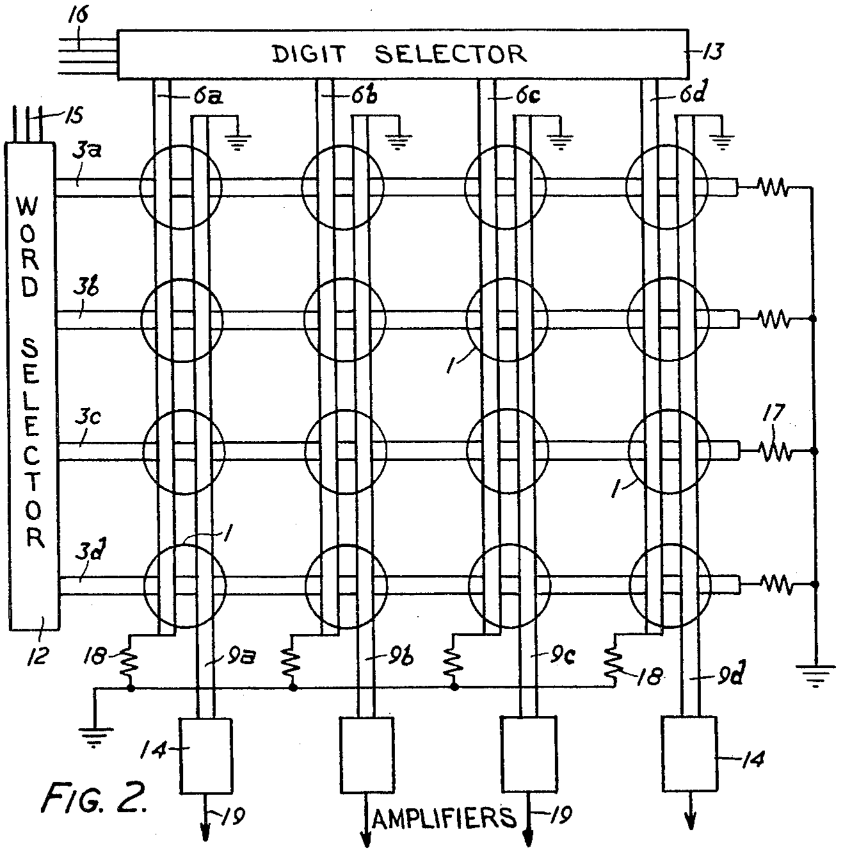
FIGURE 2 is a diagram illustrating a storage matrix utilising a plurality of individual storage elements.

The wide tolerance on driving currents and the high switching speed make the storage element described above particularly suitable for the construction of a storage matrix for use in electronic computers. A four-by-four matrix is shown, by way of example, in FIGURE 2, obviously the number of storage elements in the rows and/or columns may be increased if desired.

Each of the conductors 3_a_–3_d_, corresponding to the conductor 3 of FIGURE 1, is common to four individual films 1 and is connected to a conventional word selection matrix 12. The conductors 6_a_–6_d_, corresponding to the conductor 6 of FIGURE 1, are common to a column of four film elements and are connected to a digit selector 13.

The conductors 9_a_–9_d_, corresponding to the conductor 9 of FIGURE 1, are each connected to an amplifier 14. The conductors 6_a_–6_d_ have been shown separated from the conductors 9_a_–9_d_, and the film elements have been enlarged for the sake of clarity of illustration.

The application of a particular combination of potentials to the input lines 15 causes the word selector 12 to apply a driving pulse to a particular one of the four conductors 3_a_–3_d_, for example the conductor 3_c_. Current flows through the conductor 3_c_ and current defining resistor 17 to ground. Application of a combination of potentials to input lines 16 causes the digit selector 13 to apply a driving pulse to selected ones of the conductors 6_a_–6_d_, for example, conductors 6_a_ and 6_d_. Current will flow through these two conductors and current defining resistors 18. Only those film elements which are coupled to two current carrying drive conductors will be switched to the one state, as explained above. Hence the third row of elements from the top will be set to represent the four digit binary word 1001. The other elements of the matrix will not be switched.

The information stored in the third row of elements of the matrix may be read out any later time by applying potentials to the lines 15 only. This causes a drive pulse to be applied to the conductor 3_c_, with consequent resetting of the film elements and generation of pulses in the conductors 9_a_–9_d_. If the amplifiers 14 are responsive to negative signals only, then the amplifiers connected to the conductors 9_a_ and 9_d_ will produce a signal on output lines 19 coincident with the leading edge of the driving pulse. Ths other two amplifiers will produce no output at this time, since the film elements coupled to the conductors to which they are connected are already in the zero state and therefore produce positive pulses coincident with the leading edge of the driving pulse. All the amplifiers will, of course, produce an output on the trailing edge of the driving pulse, since a negative pulse is produced at this time irrespective of the previous state of the film.

I claim:

1. A magnetic data storage device including a storage element comprising a plane area of thin film of anisotropic magnetic material having single domain properties providing an easy axis of magnetisation and a hard axis of magnetisation perpendicular thereto, both axes lying in the plane of the film, said storage element being switchable predominantly by domain rotation between two stable magnetic states in which the magnetisation vector is in alignment with the easy axis, in one state in one direction and in the other state in the opposite direction, first means for applying a first magnetic field in the plane of the film at an acute angle to the easy axis to cause rotation of the magnetisation vector through said acute angle, second means for applying a second magnetic field in the plane of the film and perpendicular to said first field to cause in conjunction with said first field further rotation of the magnetisation vector past the direction of the hard axis to switch the element from one state to the other state and sensing means responsive to rotation of the magnetisation vector to produce an electrical signal.

2. A magnetic data storage device including a storage element on a substrate and comprising a plane area of thin film of anisotropic magnetic material having an easy axis of magnetisation and a hard axis of magnetisation perpendicular thereto, both axes lying in the plane of the film, said storage element having single domain properties and being switchable predominantly by domain rotation between two stable magnetic states in which the magnetisation vector is in alignment with the easy axis, in one state in one direction and in the other state in the other direction, a first conductor coupled with the film and extending in a direction at an acute angle to the hard axis and parallel to the plane of the film, the first conductor being effective to produce a first magnetic field in the film at said acute angle to the easy axis to cause rotation of the magnetisation vector through said acute angle, a second conductor coupled with the film and extending perpendicular to said first conductor in a plane parallel to the plane of the film, the second conductor being effective to produce a second magnetic field in the film perpendicular to the first field in the plane of the film to cause in conjunction with said first field further rotation of the magnetisation vector past the direction of the hard axis to switch the element from one state to the other state, and a third conductor coupled with said film and arranged so that rotation of the magnetisation vector produces a voltage in the third conductor, said conductors being insulated from one another.

3. A device according to claim 2 in which the third conductor extends parallel to the second conductor.

4. A device according to claim 2, in which the substrate is conductive and forms a return path for said third conductor.

5. A data storage matrix including a plurality of storage elements arranged in rows and columns and each comprising a plane area of thin film of anisotropic magnetic material having an easy axis of magnetisation and a hard axis of magnetisation perpendicular thereto, both axes lying in the plane of the element, said storage elements having single domain properties and being switchable predominantly by domain rotation between two stable magnetic states in which the magnetisation vector is in alignment with the easy axis, in one state in one direction and in the other state in the opposite direction, a first set of spaced parallel conductors extending along the rows of elements and a second set of spaced parallel conductors extending along the columns of elements each perpendicular to and insulated from said first set, each conductor of one set crossing all the conductors of the other set and lying in a plane parallel to a plane containing the storage element, the storage elements being located adjacent the crossings of the conductors with the easy axes thereof forming an acute angle with the conductors of the second set, row selection means for passing an electric current through a selected conductor of the first set to cause the magnetisation vectors of the elements in the corresponding row to rotate through said acute angle and column selection means for passing an electric current through a selected conductor of the second set to cause in conjunction with the current in the conductor of the first set further rotation of the magnetisation vector of that element located both in the selected row and selected column past the hard axis direction to switch the element from one state to the other state, and a third set of spaced parallel conductors each extending along a conductor of the second set and arranged so that rotation of the magnetisation vector of an element in a column produces an electric signal in the corresponding conductor of the third set.

6. A matrix according to claim 5 in which the film of magnetic material is continuous and the storage elements are portions of said film located at the crossing of said first and second sets of conductors and switchable by the conjunction of currents in the crossing conductors.

7. A data storage matrix comprising a planar substrate; a ferromagnetic film deposited on the substrate, the film possessing single domain characteristics and mutually perpendicular easy and hard axis of magnetisation; a set of spaced apart elongated row conductors arranged parallel to the plane of the substrate, the longitudinal axis of each conductor defining an acute angle with the easy axis of the film; a set of spaced apart elongated column conductors parallel to the plane of the substrate, the sets of row and column conductors forming a matrix of crossing points at each of which the respective row and column conductor are mutually perpendicular; a word selector operable to pass a first current pulse through a selected one of the row conductors to produce a first magnetic field in that part of the film which is adjacent to the current-carrying conductor, the magnetic field being of sufficient magnitude to align the magnetization vector of part of the film which is adjacent to the conductor in a direction substantially perpendicular to the axis of the conductor and in the plane of the film; and a digit selector operable to energize selectively the column conductors with a second current pulse to produce a magnetic field in the film, the relative magnitudes of the first and second current pulses being such that after termination of the current pulses the magnetisation vector of any elemental area of the film is left aligned along the easy axis in one direction if that film area has been subjected to either the first field or second field alone and in the opposite direction if it has been subjected to both the first and second fields.

8. A data storage matrix comprising a plane substrate of an electrically conducting non-magnetic material; a single domain ferromagnetic film on the substrate, the film having a single easy direction of magnetisation; a set of straight strip-like row conductors spaced apart in a plane parallel to the plane of the substrate, the axis of each conductor defining an acute angle with the easy direction of magnetisation of the film; a set of straight strip-like column conductors spaced apart in a plane parallel to the plane of the substrate, each of the column conductors intersecting all of the row conductors at right angles; and a set of strip-like sense conductors co-linear with the column conductors, all the conductors of all the sets being magnetically coupled to the film.

9. A data storage matrix comprising a planar single domain ferromagnetic film having a single easy direction of magnetisation; a set of straight row conductors spaced apart in a plane parallel to the plane of the film, the longitudinal axis of each conductor being at an acute angle to the easy direction of magnetisation; a set of straight column conductors spaced apart in a plane parallel to the plane of the film, each of the column conductors intersecting all of the row conductors at right angles; a word selector operable to apply a current to a selected one of the row conductors to produce a first magnetic field in the area of film adjacent to the selected conductor sufficient to switch that area from a first to a second magnetic state; a digit selector operable to apply a current to at least one of the column conductors to produce a second magnetic field which is effective in conjunction with the first magnetic field to switch an area of the film to said second magnetic state; and a set of sense conductors co-linear with the set of column conductors.

10. A magnetic thin film storage device, including a plane area of magnetic thin film having mutually perpendicular areas of hard and easy magnetisation and having a first stable magnetic state in which the magnetisation is in one direction along the easy axis and a second stable state in which the magnetisation is in the opposite direction along the easy axis; first means operable to apply temporarily to the area a first magnetic field of a magnitude exceeding the hard axis saturation field at an angle to the easy axis to produce a field component in said one direction which is of less magnitude than the field necessary in said one direction to switch the area from the second to the first stable state; and second means operable to apply a second magnetic field to provide a field component in said opposite direction which is less than the field necessary in said opposite direction to switch the area from the first to the second stable state but which component is of sufficient magnitude to switch the area to the second stable state when the first field is applied in conjunction with the second field and is terminated before the second field.

11. A magnetic thin film storage device including a plane area of magnetic thin film having mutually perpendicular hard and easy axes of magnetisation lying in the plane of the film, said area being switchable by an applied magnetic field predominantly by domain rotation between two stable magnetic states in which the magnetisation is in alignment with the easy axis, in one state in one direction and in the other state in the other direction; first means for switching the area from said one state to said other state comprising a first conductor coupled with the film and extending parallel to the film, a first current generator operable to temporarily energise the first conductor to apply a first magnetic field of saturation value to the area which field has a first component field aligned with the easy axis in said other direction; and second means operable to modify said first field to switch the area from said other state to said one state comprising a second conductor coupled with the film and extending parallel to the film perpendicular to the first conductor and a second current generator operable to energise the second conductor to produce a second magnetic field having a second component field aligned with the easy axis in said one direction said second component field having a magnitude sufficient to switch the area only if the first generator is operated; said first and second component fields each having magnitudes less than the switching threshold.

References Cited by the Examiner

UNITED STATES PATENTS

| | | | |
|---|---|---|---|
| 2,920,317 | 1/1960 | Mallery | 340—174 |
| 2,945,217 | 7/1960 | Fisher | 340—174 |
| 3,023,402 | 2/1962 | Bittmann | 340—174 |
| 3,030,612 | 4/1962 | Rubens et al. | 340—174 |
| 3,054,094 | 9/1962 | Stuckert | 340—174 |
| 3,058,099 | 10/1962 | Williams | 340—174 |

FOREIGN PATENTS 1,190,683 10/1959 France.

OTHER REFERENCES

Pages 1319–1340, Bell System Technical Journal for November 1957, vol. XXXVI, No. 6, article entitled "A New Storage Element Suitable for Large-Sized Memory Arrays—The Twistor" by Andrew H. Bobeck.

BERNARD KONICK, *Primary Examiner.*

EVERETT R. REYNOLDS, IRVING L. SRAGOW, *Examiners.*

J. F. BURNS, R. JENNINGS, J. W. MOFFITT, *Assistant Examiners.*